May 31, 1955

F. H. OWENS 2,709,636

LISTENER PREFERENCE REGISTERING AND RECORDING

Filed April 5, 1948

INVENTOR.
FREEMAN H. OWENS
BY
*Philip L. McRean*
ATTORNEY

May 31, 1955  F. H. OWENS  2,709,636
LISTENER PREFERENCE REGISTERING AND RECORDING
Filed April 5, 1948  7 Sheets-Sheet 3

INVENTOR.
FREEMAN H. OWENS
BY
ATTORNEY

May 31, 1955      F. H. OWENS      2,709,636

LISTENER PREFERENCE REGISTERING AND RECORDING

Filed April 5, 1948      7 Sheets-Sheet 4

INVENTOR.
FREEMAN H. OWENS
BY
Philip S. McKean
ATTORNEY

May 31, 1955　　　　F. H. OWENS　　　　2,709,636
LISTENER PREFERENCE REGISTERING AND RECORDING
Filed April 5, 1948　　　　　　　　　　　　7 Sheets-Sheet 5

INVENTOR.
FREEMAN H. OWENS
BY
*Philip S. McLean*
ATTORNEY

May 31, 1955     F. H. OWENS     2,709,636
LISTENER PREFERENCE REGISTERING AND RECORDING
Filed April 5, 1948     7 Sheets-Sheet 6

INVENTOR.
FREEMAN H. OWENS
BY
Philip S. M'Kean
ATTORNEY

May 31, 1955      F. H. OWENS      2,709,636
LISTENER PREFERENCE REGISTERING AND RECORDING
Filed April 5, 1948      7 Sheets-Sheet 7

INVENTOR.
FREEMAN H. OWENS
BY
ATTORNEY

United States Patent Office 2,709,636
Patented May 31, 1955

2,709,636

LISTENER PREFERENCE REGISTERING AND RECORDING

Freeman H. Owens, New York, N. Y.

Application April 5, 1948, Serial No. 19,064

2 Claims. (Cl. 346—107)

The invention herein disclosed relates to the acquiring of information pertaining to audience or listener preference and opinion.

Basic objects of the invention are to provide practical means for obtaining the listener reaction to different programs and which will be informative to the extent of showing whether the individual was actually listening to the program which may have been on and just which and how many of a group of individuals may have been interested in such program.

The invention thus aims to provide a record which will enable an advertiser, for example, to know whether his program was really listened to and what members of a family group, for example, the program appealed to.

Particularly it is a purpose of the invention to provide an audience calculating system which can be installed and operated at reasonable cost and which will be acceptable and, in fact, actually attractive to the normal users of radio sets.

It is a purpose of the invention to avoid any equipment or routine which would be at all bothersome to the various users of radios and which will assure full cooperation of the user to the extent of gaining the best considered data and opinions.

Special objects of the invention are to provide the necessary equipment in a form which will enable different members having access to a program receiver to show not only whether or not they listened to the program but whether or not they like it or approved of it.

Further objects along this same line are to make it possible for one or a number of persons to vote on a subject and actually for a number of people to ballot for or against some person or principle, all in the same broadcast or other predetermined period.

Important objects of the invention are to provide a record which will be accurate and reliable, which will be fully protected against any tampering or fraud and which will be operative and dependable in spite of power failures or other external influences.

Special objects of the invention are to provide the recorded information in complete, permanent, unchangeable form and which will prove its own authenticity.

In the accomplishment of the latter it is a purpose of the invention to provide photographic recording mechanism in the form of a simple camera unit insertable into and removable from the basic apparatus as such and which will be fully protected against accidental exposure or fogging and will become operative for its purpose only when properly inserted and sealed in the machine.

Special objects of the invention also are to provide the necessary mechanism in simple, durable, mechanical form which can be produced at reasonable cost and which will be of such design as to continue indefinitely in service without requiring special care or attention.

Other desirable objects and the novel features through which the various purposes of the invention are attained are set forth or will appear in the course of the following specification.

The drawings accompanying and forming part of the specification illustrate a present practical embodiment of the invention. Structure, however, may be modified and changed in various ways, all within the true and intended scope of the invention, as will appear from the following description and claims.

Fig. 1 in the drawings is a front elevation of a form of the machine designed for family use and arranged for any one of five named persons in a family, for instance, to show whether or not they were listening, how they regarded the program and how they would vote on a submitted question or the like;

Figure 1:
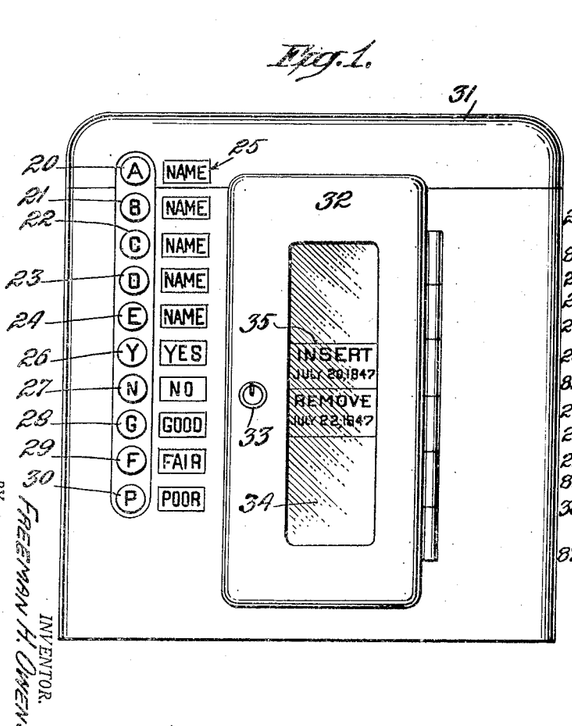

The embodiment of the invention illustrated is designed to show the preferences and to express the opinions of a group of five different individuals, it being shown in Fig. 1 as having five different push-buttons 20, 21, 22, 23, 24, denoted A, B, C, D and E with appendant name plates 25, and below these "Yes" and "No" voting buttons 26, 27, followed by "Good," "Fair" and "Poor" opinion expressing buttons 28, 29 and 30.

In this particular case the first two name buttons may be chosen by the parents and the remaining three by children in the family, thus to collect the opinions of different age groups.

Except for the exposed ends of the push-buttons all parts of the machine may be fully enclosed within an ornamental or otherwise suitable casing 31. The latter is shown as having a hinged door 32 for the insertion and removal of the recording camera, this door being shown as secured by a lock 33 releasable only by a key in the hands of an authorized agent. Also, this door is shown as having a window 34 for showing the insertion and removal dates placarded or otherwise indicated at 35 on the camera case 36. This door holds the camera in position in the apparatus.

The designated push-buttons operate to set up corresponding indicia in photographic position in the back of the casing and the camera operates automatically to photograph such indicia at successive predetermined intervals.

In the present disclosure it is contemplated that the camera make an exposure every twenty seconds and that actuated push-buttons be released every minute so that preferences and opinions can be expressed by different individuals at intervals of a minute apart.

Figure 2:
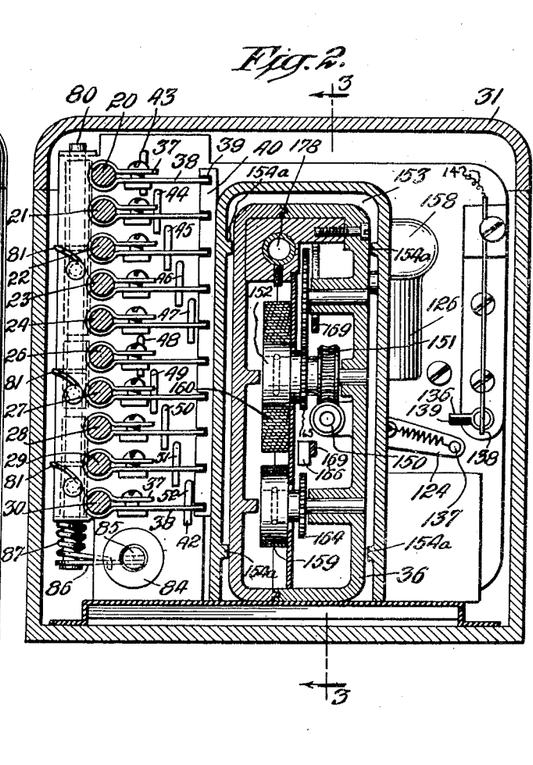
Fig. 2 is a vertical cross sectional view taken through the camera and push-button portion of the apparatus as on substantially the plane of line 2—2 of Fig. 3.
Figures 5, 6, 7, 8:
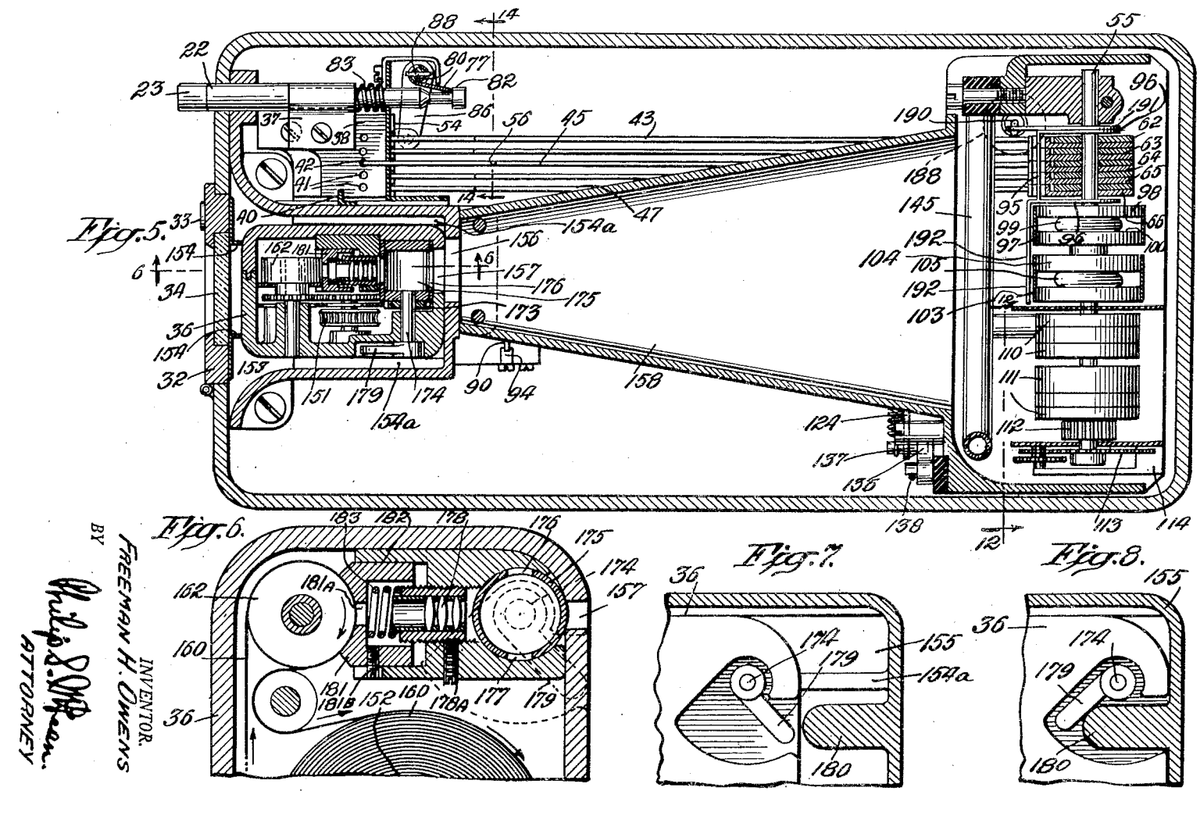
Fig. 5 is a horizontal longitudinal sectional view as taken generally on the plane of line 5—5 of Fig. 3.
Fig. 6 is a broken sectional view of the upper portion of the removable camera unit, as taken on substantially the plane of line 6—6 of Fig. 5.
Figs. 7 and 8 are broken part sectional views showing how in inserting the camera in the machine the shutter is automatically opened but only as the camera reaches its fully seated and enclosed position in the machine.
Figure 14:
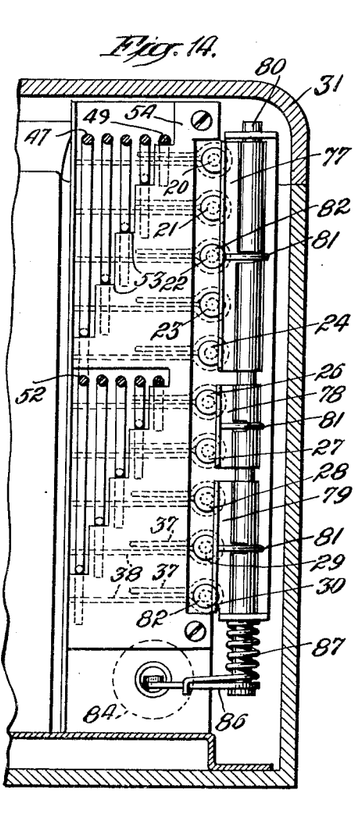
Fig. 14 is a broken sectional view of the push-button latch mechanism as taken on substantially the plane of line 14—14 of Fig. 5.

Fig. 2 shows the stem or shank portions of the push-buttons 20 to 30 as having clamped to them at 37 duplicate plates 38 sliding in notches 39 in a guide bar 40, these slide plates having a laterally extended row of perforations 41 into which are hooked the angled outer ends 42 of the different push-rods numbered from 43 to 52, Figs. 2 and 5, sliding over guide shoulders 53 on the stepped edge guide plate 54, Fig. 14.

This construction enables all the push-buttons to be alike and duplicate slide plates 38 to be used for all the push-buttons.

The top transmission rod 43 and the 6th transmission rod 48 extend straight back to equal distances above and below the horizontal transverse shaft 55 forming the center for the indicia to be photographed and the other push-wires are offset vertically as indicated at 56, Fig. 3, to locate the balance of them in these two horizontal planes.

Figure 9:
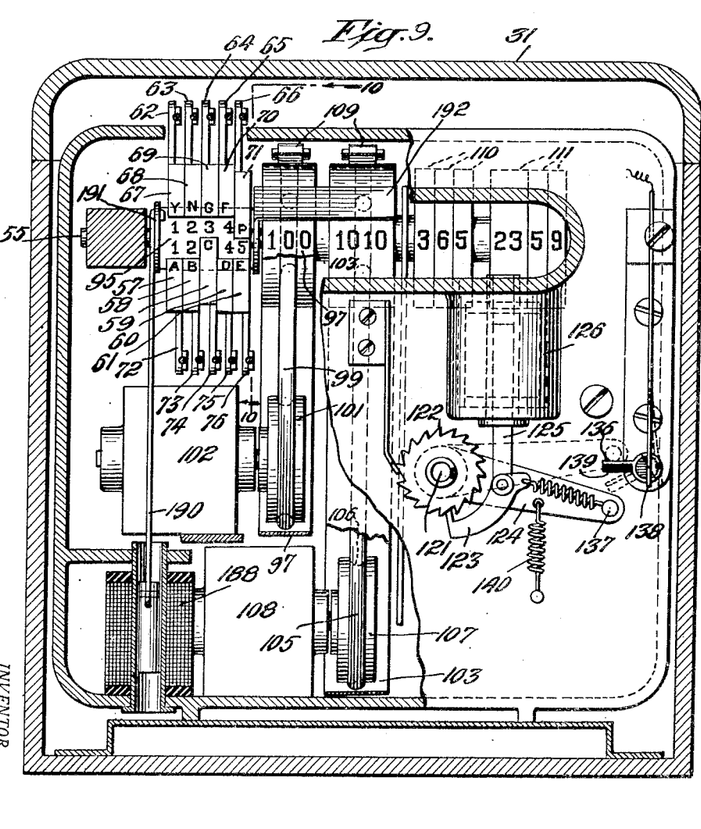
Fig. 9 is an enlarged broken cross sectional view as on substantially the plane of line 9—9 of Fig. 3.
Figure 10:
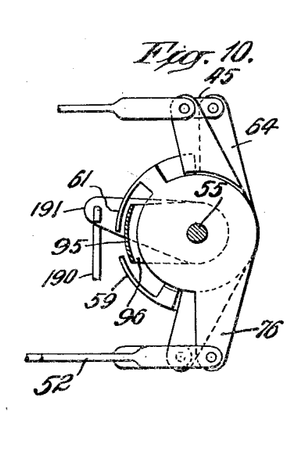
Fig. 10 is a broken and part sectional detail view of the individual identifying, voting and opinion expressing markers or indicators with parts appearing as on substantially the plane of line 10—10 of Fig. 9.

The indicators are shown in Figs. 9 and 10 as comprising the individual designating plates 57, 58, 59, 60, 61, marked A, B, C, D and E, pivoted in arcuately traveling relation on the mounting shaft 55 and having upstanding lever arms 62, 63, 64, 65, 66 engaged by the inner ends of the push-wires 43, 44, 45, 46, 47.

These A, B, C, D, E or individual designating indicators are rocked upwardly into the exposure position and generally corresponding "Yes," "No," "Good," "Fair" and "Poor" indicators 67, 68, 69, 70, 71 are rocked downwardly into the exposure line by the rock levers 72, 73, 74, 75, 76, respectively, connected with the inner ends of the push-wires 48, 49, 50, 51, 52.

The indicators are temporarily held in the position of exposure by automatic detents for the push-buttons shown in Figs. 5 and 14 as one long pawl 77 for the upper set of five push-buttons, a short pawl 78 for the "Yes" and "No" buttons and a pawl 79 for the three quality expressing push-buttons, these pawls being pivoted on a single vertical shaft 80 and rocked by springs 81 to engage behind locking shoulders 82 at the inner ends of the push-button stems, Fig. 5.

Springs 83, Fig. 5, thrust the buttons outward when freed of the holding pawls 77, 78, 79, and the buttons are automatically cleared at close intervals to enable a number of different listeners to express the same or different opinions in the same boadcast period.

In the illustration the clearing of the registering buttons is effected by a solenoid 84 having a core 85, Fig. 2, connected with an arm 86 on the lower end of the shaft 80, said solenoid having the effect of rocking shaft 80 against the tension of spring 87 in a counter-clockwise direction, Fig. 5, to cause cross pins 88 on the shaft in slots 89 in the pawls to rock the pawls from behind the locking shoulders 82 on the inner ends of the buttons.

Figure 3:
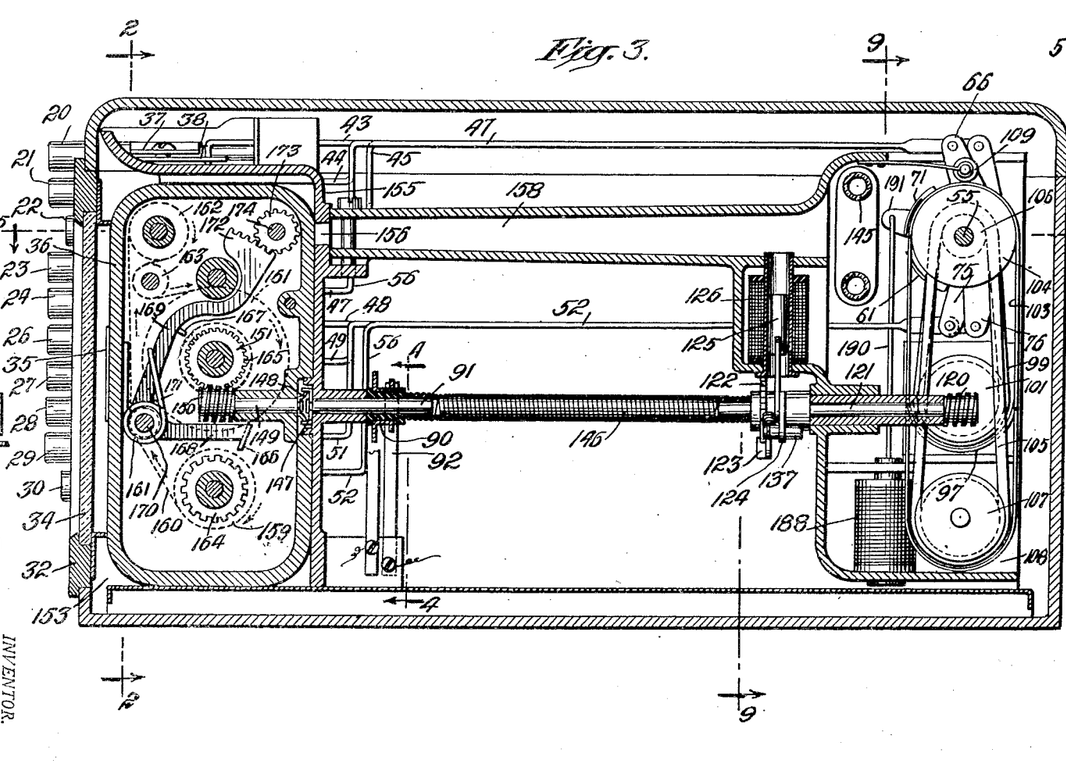
Fig. 3 is a longitudinal sectional view of the apparatus as taken on substantially the plane of line 3—3 of Fig. 2.
Figure 4:
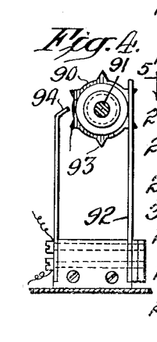
Fig. 4 is a broken part sectional view of the rotary star wheel switch as taken on substantially the plane of line 4—4 of Fig. 3.

This button clearing solenoid is energized each minute, in the present disclosure, by a star wheel form of switch shown in Figs. 3 and 4 as consisting of a wheel 90 mounted in insulated relation on the intermittently turned shaft 91, continuously engaged at one side by a spring brush 92 and having spaced points or spurs 93 which engage, one each minute, with the top of a spring brush 94 at the opposite side. The shaft 91 is turned by the battery operated solenoid 126 through the connecting flexible shafting 146, Fig. 3.

The set identification in the present case is provided by a plate 95, Figs. 9 and 10, shown as carrying the identifying number 12345 in duplicate, one row above the other, supported by arms 96 in fixed relation on the shaft 55 behind the lower and upper set of indicators 57—61 and 67—71. This is so that if a number, say in the upper row, is concealed by one of the upper indicators, that same number will normally be uncovered by the oppositely disposed indicator in the lower row so that the identification will still be complete by the combination of numbers exposed in the two rows.

The other indicators, showing in the present disclosure volume of reception, tuning or station received, day of the year and time of the day, are shown in Fig. 9 arranged in this order at the side of the indicators and identifying plate last described, in photographic position.

The volume indicator is shown as a belt 97, Figs. 5, 9, 15 and 16, carrying suitable volume designations such as from zero to one hundred, supported on a pulley 98 free on shaft 55 and positioned by a belt 99 engaged with a reduced intermediate portion 100 of the pulley and running from a pulley 101 of a "Selsyn," servo or like repeater motor 102 connected to follow the positioning of the volume control on the radio receiving set.

The tuning or station indicator is shown as similarly constructed in the form of a belt 103 carrying suitable tuning or station designations and supported on a pulley 104 loose on shaft 55 and positioned by a belt 105 engaged with a reduced intermediate portion 106 of the pulley and running from a pulley 107 on the Selsyn or repeater motor 108 which in this case is coupled with the tuning or station selecting mechanism of the radio receiver.

The two indicator belts described are shown as held in non-slipping engagement on their supporting pulleys by spring pressed rolls 109, Figs. 3 and 9.

The day of the year indicator is shown as made up of three indicator discs 110 geared or coupled in the manner of conventional multiple disc counters to carry the count successively from one disc to another.

The time of the day indicator is shown as of similar construction made up of the coupled hour and minute counting discs 111.

Figures 12, 13:
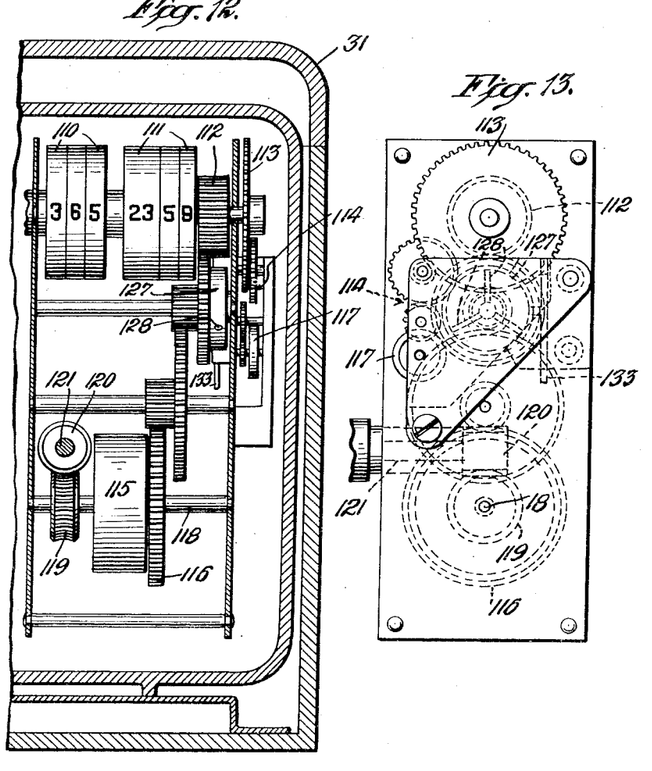
Fig. 12 is a broken vertical sectional view of the clock mechanism and of the dials indicating the day of the year and the time of the day, the section being taken as on substantially the plane of line 12—12 of Fig. 5.
Fig. 13 is a front elevation of the clock mechanism on a larger scale and with the intermittently acting winding shaft shown broken away.

The two sets of counter discs 110 and 111 are indicated in Fig. 12 as driven through suitable lines of gearing 112 and 113, from a clock movement or escapement train 114.

A feature of this clock mechanism is that it is powered independently of lighting circuits so that it will continue in operation regardless of ordinary power failures.

The clock movement is shown as embodying a spring barrel 115, Figs. 12 and 13, coupled by gearing 116 with the escapement action 117, the spring barrel being mounted on a shaft 118 carrying a worm gear 119 engaged by worm 120 on shaft 121. The latter, as shown in Figs. 5 and 9, carries a ratchet 122 engaged by pawl 123 on lever 124 connected with the core 125 of the winding solenoid 126.

Figure 11:
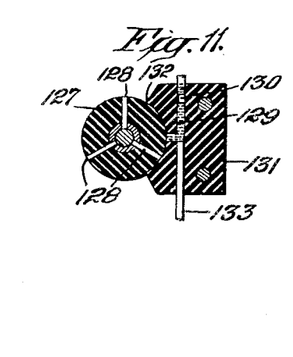
Fig. 11 is a broken sectional detail of the twenty second mercury switch.

The solenoid 126 is energized at short intervals, in this case every twenty seconds, by a special mercury switch shown in Figs. 11, 12 and 13, as made up of an insulating disc 127 carrying three equally spaced, radially extending conductors 128 to register with the mercury 129 contained in the cavity 130 in the stationary insulating block 131 which has the arcuate recess 132 spaced from the edge of the rotating disc. A terminal wire 133 connects with the mercury in the well 130 and the three metallic arms 128 in the discs are grounded or otherwise connected in the other side of the circuit. The disc 127, through the arms 128, thus closes circuit through the body of mercury three times for each revolution and hence each twenty seconds for a disc rotating one revolution per minute.

Figure 15:
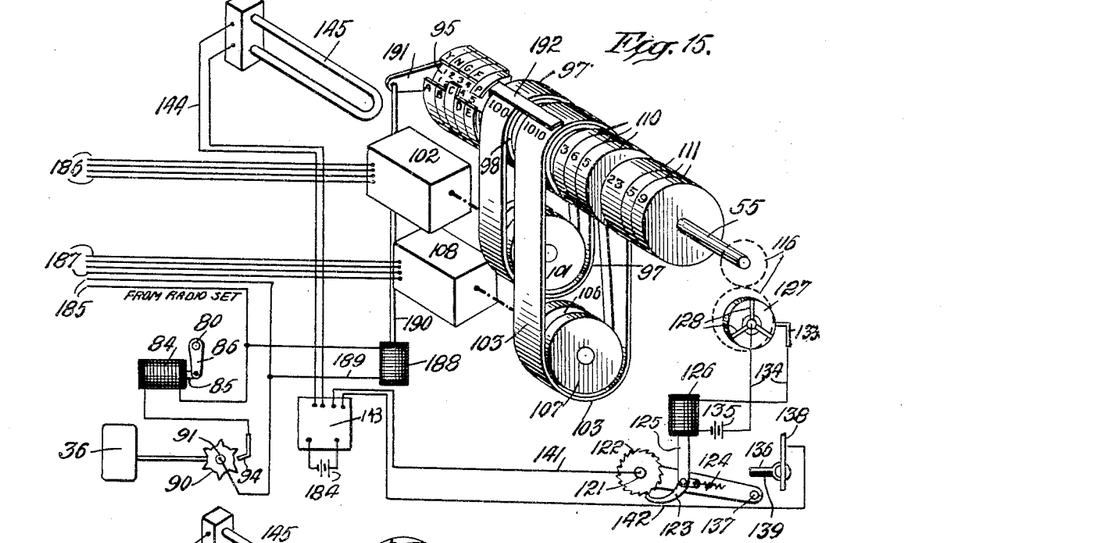
Fig. 15 is a diagram illustrating relation of mechanical and electrical parts for a battery operated form of the invention.
Figure 16:
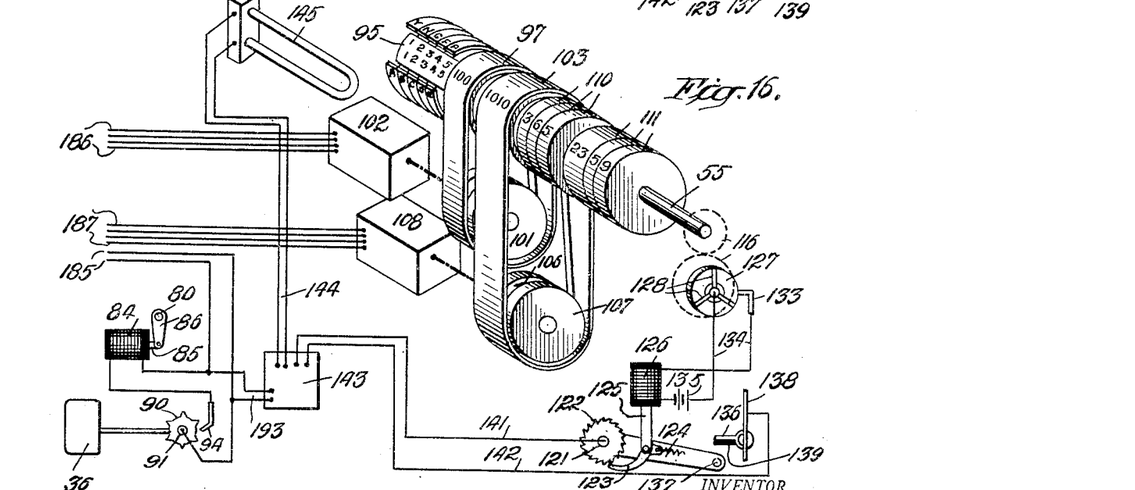
Fig. 16 is a similar view for a form of the invention deriving power from the radio receiving set with which it may be associated, and employing a battery to operate the clock, advance the film and operate the switch for the flashlight.

The wiring diagrams, Figs. 15 and 16, show how this mercury switch 127 directly in the clock train 116 will close circuit through wiring 134 to energize the winding magnet 126 from a battery 135.

The winding magnet 126 is utilized in the present disclosure for the further purpose of flashing the lamp to make the exposures after advancing the film or recording strip in the camera.

The light flashing switch is shown as a pivoted tumbler 136, Fig. 9, positioned in the path of a pin or roll 137 on the free end of the solenoid lever 124, a spring wire 138 bearing against the back of this tumbler to permit it to swing freely to the travel of the pin in both directions and to come back to a substantially horizontal position. The lower side of the tumbler is shown covered with insulation 139 so that the pin in passing upward in the movement of winding the spring clock barrel will not close a circuit. However, on the down stroke or recovery movement of the solenoid lever as impelled by spring 140, the pin 137 will engage the metallic upper face of the tumbler to close circuit through wiring 141, 142, Figs. 15, 16, to the control box 143 connected by wiring 144 with the lamp 145. The latter is indicated as a high intensity, quick acting, condenser discharge tubular form of lamp positioned to illuminate the face of the complete set of indicators.

The advancement of the recording strip 160 is accomplished by the connection of the solenoid actuated shaft 121 through a helical spring coupling 146, Fig. 3, with the button re-set switch shaft 91 and by the provision of the latter shaft with a jaw clutch element 147 to be engaged by a clutch element 148 exposed in the front wall of the camera case and carried by a shaft 149 connected by worm and worm gear 150, 151, with the take-up spool 152 of the camera.

The camera 36, as shown in Figs. 2, 3 and 5, is slidingly guided and confined within the seat or cavity 153 provided for it by guiding ribs 154a, in which position it is removably held by the confining ribs or flanges 154 on the inner face of the hinged door 32.

A flared light enclosure 158 is shown extending from the light opening 156 back to the lamp 145 and the indicators illuminated thereby.

The camera, as shown in Figs. 3, 5 and 6, carries a supply spool 159 for the film or other photographic medium 160 which extends therefrom over guide rollers 161, 162, 163, to the take-up spool 152. The two spools are shown as toothed or connected with gear elements 164, 165, engageable by holding pawls or dogs 166, 167, on the arms 168, 169, of a forked lever pivoted at 170 and acted on by spring 171 to rock the dogs into locking engagement with the respective spools.

The arm 169 with the spool locking lever is shown in Fig. 3 as extended upwardly and carrying a geared segment 172 in mesh with a pinion 173 on a shaft 174 carrying a tubular shutter 175 in back of the window or exposure aperture 157 in the front of the camera.

The tubular shutter 175, as shown in Fig. 6, has diametrically opposite light passages 176, 177, which with rotation of the shutter can be made to register with the light aperture 157 and the lens system 178 of the camera, as in Fig. 5. The lens mount is held in a locked position by screw 178A.

The camera shutter, through interconnection with the spring tensioned holding lever 168, 169, Fig. 3, is secured closed and both spools locked against movement when the camera is detached from the apparatus.

When, however, the camera is inserted in the apparatus, the shutter is automatically moved to the open position and the film spools released through the medium of a lever 179 on the outer end of the shutter shaft 174, Fig. 7, which engages with a projection 180 on the inner wall 155 of the camera receiving cavity and is forced back as in Fig. 8 to move the shutter to the open position and to unlock the film spools 152 and 159 as the camera is moved into its operative position and so held by the closing of the door 32.

Fig. 6 shows how the film or record strip 160 is held smooth on the guide and supporting roll 162 by a film gate 181 slidably mounted in the guide 182 in line with the optical system and tensioned toward the roll by spring 183. This film gate member has an aperture 181A for confining the exposure on the film and it is guided and held against rotative movement by a screw pin 181b slidingly received in a slot in the bottom of the lens and shutter housing and guide structure 182.

The diagrams, Figs. 15 and 16, show how the apparatus may be operated from a local source of power such as the battery 134 for charging the condenser to flash the lamp, as in Fig. 15, or the power for this purpose be derived from power lines 185 taken from the radio set, as in Fig. 16. In both instances the power for advancing the film and operating the time clock and hence advancing the time indicating mechanism, is provided by the local source of energy at 135 so that all such mechanism will continue in operation regardless of power interruptions.

In both these embodiments also the key or button clearing magnet 84 is shown as energized from the radio extension circuit leads 185 under control of the star wheel timing switch 90 which is stepped by the main winding magnet 126.

In both diagrams the volume and tuner Selsyns or repeater motors 102 and 108 are indicated as connected by suitable wiring 186, 187, with the master Selsyns or control motors at the radio set.

In both the diagrams the tumbler switch at 136 will be actuated each twenty seconds to close the circuit for flashing the lamp.

In Fig. 15, since the lamp operates on a local power source, the battery 134, the lamp will actually be flashed each 20 seconds to make an exposure, whether or not the radio set is on. To show whether at such times the radio set is on, there is provided in the illustration a shutter 192, Figs. 5 and 9, adapted to drop down over the readings on the volume and station indicators 97, 103, when the set is off, this shutter being held up in the non-obscuring position when the set is on, by a magnet 188 connected by wiring 189 with the power line 185 from the radio set and operating a plunger 190 connected with a lever arm 191 pivoted on the supporting shaft 55 and carrying the shutter plate 192.

Hence with the Fig. 15 form of the invention a photograph will be made for each twenty second interval. If the set is on at the time, the full line of readings will appear, and if the set is off the shutter will blank off the volume and station readings to show such fact.

In Fig. 16, where the power for the lamp is derived from the radio power line 185 through branch connections 193, the lamp will not be flashed and hence no photograph will be taken when the radio receiver is off, and this will be direct indication of the "Off" condition of the set.

Figure 17:
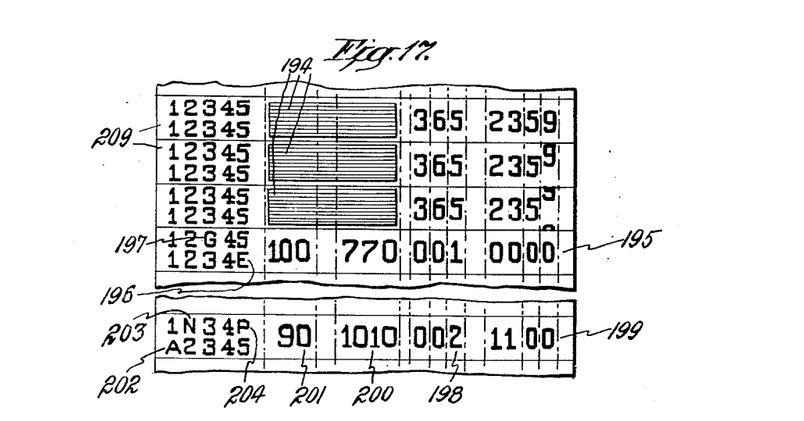
Figs. 17 and 18 are broken plan views of portions of record strips produced by the systems illustrated in Figs. 15 and 16, respectively.

Fig. 17 illustrates a record such as may be produced with the arrangement shown in Fig. 15. In this particular instance the blanks indicated at 194 produced by lowering of the shutter 192 show that the set was off in the last minute at the end of the day's record, that the set was turned on, full volume (100), to station 770 at the start of the new day indicated by the reading at 195, and that the party identified as "E" at 196 expressed approval of that program ("G") at 197.

This record further shows at 198 that on the second day thereafter, at the 11th hour, shown at 199, the set was turned on to station 1010, as shown at 200, to nearly full volume (90), at 201 and that the party identified as "A" at 202 voted "No" at 203 and expressed opinion of the program as "Poor" at 204.

Figure 18:
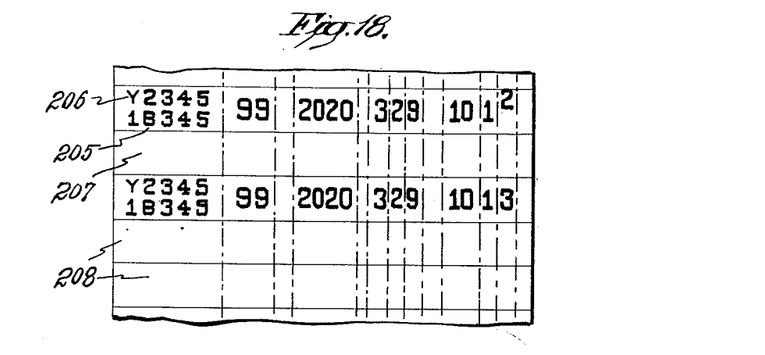

The record strip appearing in Fig. 18 and produced by the system outlined in Fig. 16, shows that the party identified at 205 as "B" voted "Yes" at 206 on a program from station identified as 2020, being listened to at nearly full volume and on the air on the 329th day at 12 minutes after 10. The blank row at 207 shows that the set was then turned off, so that no picture was taken, and the next row shows that the set was again turned on at 10:13 to the same station and with the same volume, and that the individual identified as "B" again voted "Yes" and, further, that the set was then again turned off, as shown by blank spaces at 208.

It is to be noted that in all the exposures the identity of the set appears at 209 and that the two rows of identifying numerals provide sufficient identification even if one or more numbers in one of the other rows may be covered by the individual identifying, opinion or voting indicators.

The invention provides a direct reading photographic record of actual conditions as to audience participation and reaction. With the data in photographing position all positioned in one line it is quickly and easily read and analyzed and particular items of interest extracted for what they may be worth. This record may be enlarged, projected or shown in any other way. Accurate copies can be made, as many as may be needed. The record may be on photographic film, sensitized paper or the like. Each item being all on one line requires but small linear space so a strip of reasonable length will carry the recording over a considerable period, even with exposures made at such short intervals as twenty seconds as herein exemplified.

The record shows all items essential for proper analysis and computation, such as whether a set was off or on at the time a particular program was on the air and whether, if on, it was actually being listened to and by how many individuals, possibly in different age groups, and how these individuals of different ages reacted to such a program. Also, possibly, how one or more of them voted on some question being polled at the time.

Actual audience participation is made possible and attractive in that the individual is able to immediately register his or her own preference and like or dislike for any special program. And right in the course of the same program the different individuals, possibly of different age and sex, may express opposite or divergent views as to such program or subject matter presented.

The apparatus required is relatively simple for what it accomplishes and constitutes of itself a complete unit which can be treated as such and be readily connected without disturbing the radio receiver other than by providing the simple connections such as illustrated. The connections from the volume control and tuner may be electrical, as herein illustrated, or they may be mechanical, in which latter event the volume and station indicators such as 97 and 103 might be arranged to be directly operated from the receiver. In the latter event the recording mechanism may be built into the radio receiving set, instead of constructed as a separate unit, such an arrangement being within the contemplation of the invention.

The camera is of small size and has the exposure aperture shutter automatically closed and the film spools locked tight when removed from the rest of the apparatus and so can be handled freely and shipped by mail or other convenient mode of transportation. This simplifies operations, enabling the cameras to be mailed to the users as records are desired, and the cameras being mailed back to the servicing company as the records are completed.

The camera is quickly and easily removed from and placed in the chamber provided for it and the parts may be interfitted so that the camera will go into the chamber only in the one proper way.

The invention is of extremely broad scope and capable of being carried out in different structural forms, so the terms employed in this disclosure have been used in a descriptive rather than in a limiting sense. Certain features of invention which are separately patentable are covered in separate divisional applications.

What is claimed is:

1. In a radio listener survey recorder including a radio, a time indicator, an opinion indicator, a program identifying indicator and a camera, the improvement comprising a light excluding cabinet having an exteriorly accessible compartment in one end, said compartment being provided with an opening into the interior of the cabinet, individual opinion expressing indicators, program identifying indicators and time indicators, said indicators being positioned within the cabinet in side by side relation in position for simultaneous photographing at the end opposite said compartment and in line with said opening of said exteriorly accessible compartment, a shaft positioned across the end of said compartment in driving connection with said time indicators, a clock movement, said clock movement being adapted to drive said shaft, means for initially operating said opinion indicators, said means being positioned on the outside of said cabinet and supported on one wall thereof, retaining means for temporarily holding said opinion expressing indicators in a position to which they have been shifted, said means being positioned within said cabinet means operated by said clock movement for automatically releasing said retaining means a predetermined time after the operation of said opinion expressing indicators, means connecting said program identifying indicator with the tuning dial of said radio whereby when said radio is tuned to a station the said station will be shown on said program identifying indicator, a light source for illuminating said indicators, a camera positioned within the exteriorly accessible compartment in line with said opening therein for effecting successive photographic exposure of said indicators, means actuated by said clock movement for controlling intermittently the operation of said camera and activation of said light source, said camera being an independently removable unit having an exposure opening and a film strip supporting and advancing means, a closure for said exposure opening, a lock for the advancing means and means positioned in said compartment for automatically opening said closure and releasing said lock when said camera unit is inserted into position for operation, a winding shaft for said clock movement, a magnet connected to said shaft for imparting intermittent turning movement thereto, electrical means controlled by said clock movement for intermittently energizing said magnet at predetermined time intervals and a switch operated by said winding shaft for energizing said light source.

2. The invention of claim 1, in which a local source of power is provided for energizing said magnet and for flashing the indicator line illuminating lamp to continue the machine in operation in event of power failure.

References Cited in the file of this patent

UNITED STATES PATENTS

| | | |
|---|---|---|
| 1,158,774 | Beard | Nov. 2, 1915 |
| 1,805,665 | Hough | May 19, 1931 |
| 1,908,947 | Benjamin | May 16, 1933 |
| 2,091,768 | Noble | Aug. 31, 1937 |
| 2,203,906 | Hineline | June 11, 1940 |
| 2,256,417 | Sturgel | Sept. 16, 1941 |
| 2,282,029 | Bryce | May 5, 1942 |
| 2,368,761 | Hogan | Feb. 6, 1945 |
| 2,392,890 | Vincent et al. | Jan. 15, 1946 |
| 2,427,355 | Keinath | Sept. 16, 1947 |
| 2,427,670 | Goldsmith | Sept. 23, 1947 |
| 2,484,733 | Rahmel et al. | Oct. 11, 1949 |
| 2,488,508 | Goldsmith | Nov. 15, 1949 |
| 2,545,553 | Lolli et al. | Mar. 10, 1951 |

FOREIGN PATENTS

| | | |
|---|---|---|
| 299,707 | Italy | Aug. 1932 |